(12) United States Patent
Venkatakrishnan et al.

(10) Patent No.: US 12,287,232 B2
(45) Date of Patent: Apr. 29, 2025

(54) OVERFLOW DETECTION SYSTEM FOR A GREASE TRAP

(71) Applicant: Starbucks Corporation, Seattle, WA (US)

(72) Inventors: Natarajan Venkatakrishnan, Seattle, WA (US); Ryan T. Bell, Mill Creek, WA (US); Lucas S. Abrahamsen, Seattle, WA (US)

(73) Assignee: Starbucks Corporation, Seattle, WA (US)

( * ) Notice: Subject to any disclaimer, the term of this patent is extended or adjusted under 35 U.S.C. 154(b) by 0 days.

(21) Appl. No.: 18/661,798

(22) Filed: May 13, 2024

(65) Prior Publication Data

US 2024/0393158 A1 Nov. 28, 2024

Related U.S. Application Data

(60) Provisional application No. 63/469,243, filed on May 26, 2023.

(51) Int. Cl.
  *G01F 23/60* (2006.01)
  *G01F 23/44* (2006.01)
  *G01F 23/70* (2006.01)

(52) U.S. Cl.
  CPC .......... *G01F 23/703* (2013.01); *G01F 23/443* (2013.01)

(58) Field of Classification Search
  None
  See application file for complete search history.

(56) References Cited

U.S. PATENT DOCUMENTS

| 2,184,605 | A | * | 12/1939 | Roberts | G01F 23/32 200/325 |
| 2,899,517 | A | * | 8/1959 | Hastings | G01F 23/60 116/228 |
| 4,850,223 | A | * | 7/1989 | Carlin | G01M 3/3245 73/292 |

(Continued)

FOREIGN PATENT DOCUMENTS

| CN | 112085920 | * | 12/2020 | |
| CN | 112382066 | A | 2/2021 | |
| DE | 102005018879 | A1 | * 11/2005 | A47L 15/4244 |

OTHER PUBLICATIONS

PCT Search Report and Written Opinion for PCT/US2024/028528 mailed Sep. 20, 2024.

*Primary Examiner* — John E Breene
*Assistant Examiner* — Alex T Devito
(74) *Attorney, Agent, or Firm* — Kilpatrick Townsend & Stockton LLP

(57) ABSTRACT

An overflow detection system for a grease trap or other receptacle is provided. The overflow detection system includes an overflow sensor. The overflow sensor can include a switch and a processor. The switch can include a float configured to float in a fluid in the receptacle, a surface that is separate from the float, and a resilient member coupled between the float and the surface. The switch can generate a signal in response to the float being within a predefined distance of (e.g., contacting) the surface. The processor can receive the signal from the switch and, in response, transmit a notification to a user device that is remote from the receptacle. The notification can indicate a high fluid level in the receptacle.

18 Claims, 7 Drawing Sheets

(56) References Cited

U.S. PATENT DOCUMENTS

| | | | |
|---|---|---|---|
| 7,417,552 B1* | 8/2008 | Vaskovic | G01F 23/802 |
| | | | 248/152 |
| 8,967,191 B1 | 3/2015 | DeVerse et al. | |
| 2001/0029782 A1* | 10/2001 | Articolo | G01F 23/0038 |
| | | | 73/314 |
| 2006/0248952 A1* | 11/2006 | Jarvie | G01N 9/18 |
| | | | 73/444 |
| 2007/0013536 A1* | 1/2007 | Wang | G01F 23/0015 |
| | | | 340/623 |
| 2014/0361887 A1 | 12/2014 | Eskildsen et al. | |

* cited by examiner

OVERFLOW DETECTION SYSTEM FOR A GREASE TRAP

CROSS-REFERENCE TO RELATED APPLICATIONS

This application claims priority to U.S. Provisional Application No. 63/469,243, filed on May 26, 2023 and titled "OVERFLOW DETECTION SYSTEM FOR A GREASE TRAP SENSOR," the entirety of which is hereby incorporated by reference herein.

TECHNICAL FIELD

The present disclosure relates generally to overflow detection. More specifically, but not by way of limitation, this disclosure relates to an overflow detection system for a grease trap or other receptacle.

BACKGROUND

Grease traps are used in many restaurants and other stores to collect FOG (Fats, Oil, and Grease) from all the drains used within the store. Grease traps must be regularly cleaned to prevent them from overflowing. Because stores typically have passive grease traps which require manual cleaning (e.g., pumping) to remove the FOG that was trapped, there is no automatic removal or cleaning of the FOG. Therefore, a grease trap can overflow for any number of logistical or capacity/throughput driven reasons. Such overflows may be within or just outside of a store, and may occur above or below ground. If a grease trap overflows, normally the FOG is the first thing to overflow, because it floats to the top of the fluid mixture within the trap. Such FOG overflows are not only dangerous but can also damage equipment.

SUMMARY

On example of the present disclosure includes an overflow sensor comprising a switch. The switch can include a float configured to float in a fluid in a receptacle, a surface that is separate from the float, and a resilient member coupled between the float and the surface. The resilient member can be configured to normally hold the switch in an open position by spacing the float at a first distance from the surface. The switch can be configured to generate a signal in response to the float being within a second distance of the surface. The resilient member can be configured to allow the float to come within the second distance of the surface when the fluid in the receptacle exceeds a predefined fluid level. And the resilient member can be configured to prevent the float from coming within the second distance of the surface when the fluid in the receptacle does not exceed the predefined fluid level. The overflow sensor can also include a processor coupled to the switch. The overflow sensor can further include a memory including instructions that are executable by the processor for causing the processor to: receive the signal from the switch; and in response to receiving the signal, transmit a notification to a user device that is remote from the overflow sensor.

Another example of the present disclosure includes a receptacle comprising a fluid and an overflow sensor. The overflow sensor can include a switch. The switch can include a float configured to float in the fluid in the receptacle. The switch can also include a surface that is separate from the float. The switch can further include a resilient member coupled between the float and the surface. The switch can be configured to generate a signal in response to the float being within a predefined distance of the surface. The overflow sensor can also include a processor coupled to the switch. The overflow sensor can further include a memory including instructions that are executable by the processor for causing the processor to: receive the signal from the switch; and in response to receiving the signal, transmit a notification to a user device that is remote from the receptacle.

Yet another example of the present disclosure can include a method. The method can include detecting, by an overflow sensor positioned in a fluid in a receptacle, that a surface of the overflow sensor is within a predefined distance of a float of the overflow sensor. A resilient member can be coupled between the float and the surface of the overflow sensor. The method can include, based on detecting that the surface of the overflow sensor is within the predefined distance of the float, transmitting, by a processor of the overflow sensor, a notification to a user device that is remote from the receptacle.

DETAILED DESCRIPTION

Figure 1:
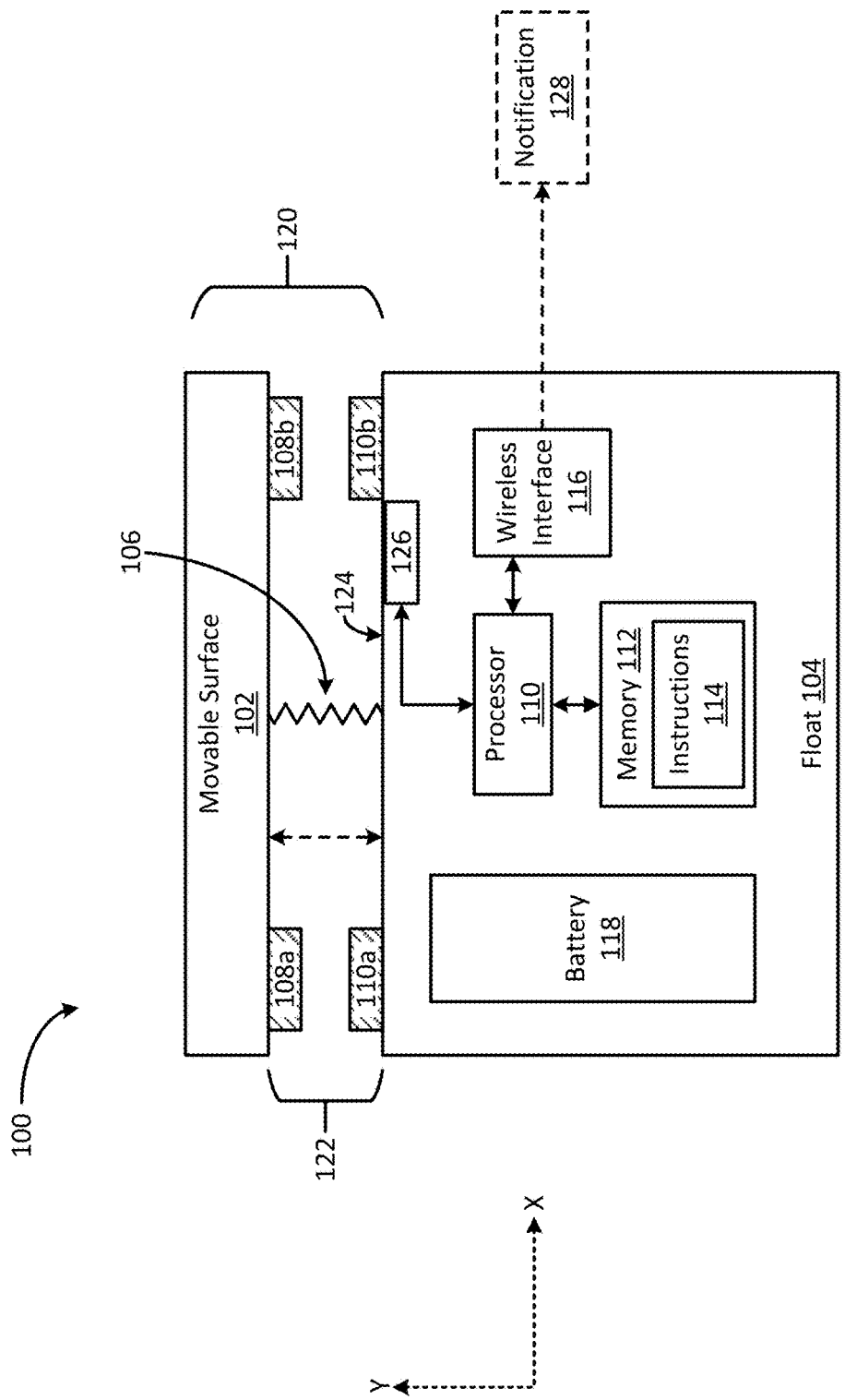
FIG. 1 shows a block diagram of an example of an overflow sensor according to some aspects of the present disclosure.

Certain aspects and features of the present disclosure relate to an overflow sensor usable to detect a high fluid level in a receptacle such as a grease trap. A high fluid level can be a fluid level that is above a predefined threshold, such as 90% of the height of the receptacle. Upon detecting a high fluid level, the overflow sensor can wirelessly transmit a warning notification to a user about the high fluid level. This can allow the user to clean out the receptacle (e.g., to pump out fluid) to prevent overflow of the fluid.

The overflow sensor can be powered by a battery so that it lacks any external cables, such as power lines. And the overflow sensor may communicate wirelessly using low-frequency signals (e.g., signals below 100 Hz), so that the overflow sensor can be used in situations that would otherwise attenuate the wireless transmissions too much, such as if the receptacle is made of metal or concrete, or if the receptacle is buried underground. The overflow sensor may also be able to freely float in the fluid, so that it is not affixed to any surfaces within or outside of the receptacle. These features can allow the overflow sensor to be easily installed and used in a wider variety of applications.

More specifically, in some examples, the overflow sensor can include a floating body, which is also referred to herein as a float. The floating body can be configured to float at the surface of the fluid. The overflow sensor can also include a switch coupled to the floating body. For example, the switch can be coupled to the top of the floating body. The switch can include a moveable surface separated from the floating body by a resilient member, such as a spring. As the fluid level in the receptacle rises, the overflow sensor can rise with the fluid, given that it is free floating in the fluid. Eventually the fluid level can rise to a high enough level that the switch abuts a vertical limit (e.g., a top, shoulder, or beam of the receptacle) and compresses, thereby triggering the overflow sensor to transmit a warning notification to the user.

In other examples, the overflow sensor can include a body affixed to an underside of the top of the receptacle. The overflow sensor can also include a switch coupled to the body. For example, the switch can be coupled to the bottom of the body. The switch can have a float separated from the body by a resilient member. As the fluid level in the receptacle rises, eventually the fluid level can rise to a high enough level that the fluid pushes the float upwards to compress the switch, thereby triggering the overflow sensor to transmit a warning notification to the user.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of an overflow sensor 100 according to some aspects of the present disclosure. The overflow sensor 100 includes a switch 120 positioned on the top of a float 104. The float 104 can be configured to float in a fluid, such as water or a mixture of fat, oil, and grease. For example, the float 104 can be made of a plastic or rubber material having a suitable density to float to the top of such a mixture.

The switch 120 can include a movable surface 102 coupled to the float 104 by one or more resilient members 106. The movable surface 102 can have any suitable shape and be formed from any suitable material, such as plastic or metal. The one or more resilient members 106 can be configured to expand and contract along the vertical axis of the overflow sensor 100, as represented by the double-sided dashed arrow in FIG. 1, so that the movable surface 102 can move toward and away from the float 104. Examples of such resilient members 106 can include a spring (e.g., a coil spring or a leaf spring) and/or an elastic rod. The resilient members 106 can be configured to normally hold the switch 120 in an open position. For example, the resilient members 106 can exert an expansion force along the vertical axis, which can be perpendicular to a longitudinal length the movable surface 102, to maintain the movable surface 102 at a default distance 122 from the float 104 during normal operating conditions (e.g., when the grease trap is not overfilled).

To use the overflow sensor 100, the overflow sensor 100 can be disposed inside of a receptacle such as a grease trap. The overflow sensor 100 may not be affixed to any portion of the receptacle, but rather may be left floating in the fluid in the receptacle (or sitting on the bottom of the receptacle if the receptacle is empty). While the overflow sensor 100 is floating in the fluid during normal operating conditions, at least some of the overflow sensor 100 can sit in the fluid and at least some of the overflow sensor 100 can sit above and outside the fluid. For example, the float 104 can sit in the fluid and the movable surface 102 of the switch 120 can sit above and outside the fluid. As the amount of fluid in the receptacle increases, the overflow sensor 100 will rise given that it floats at the surface of the fluid. When the amount of fluid rises to a high enough level, the movable surface 102 may contact an upper interior surface (e.g., the top) of the receptacle, which prevents further upward movement of the movable surface 102. If more fluid subsequently enters the receptacle, the continued upward movement of the float 104 can cause the one or more resilient members 106 to compress between the movable surface 102 and the float 104. For example, the resilient members 106 can compress along the vertical axis (e.g., Y-axis) between the movable surface 102 and a surface 124 of the float 104. When the resilient members 106 compresses far enough, the switch 120 can close. The overflow sensor 100 can detect the closure of the switch 120 and responsively output a notification 128 to a user. The notification 128 can indicate that the receptacle has a high fluid level that is approaching overflow.

In some examples, the switch 120 can include a contact sensor that includes one or more contacts 108a-b, 110a-b on opposing surfaces. For example, the switch 120 can include one or more contacts 108a-b on an underside of the movable surface 102 and one or more contacts 110a-b on the surface 124 of the float 104. The contacts 108a-b, 110a-b can be made of any suitable conductive material, such as metal. When the contacts 108a-b on the movable surface 102 touch the contacts 110a-b on the float 104 (e.g., during a compression of the resilient members 106), the contact sensor can detect the contact and output a corresponding signal. Based on this signal, the overflow sensor 100 can transmit the notification 128 to the user.

Additionally or alternatively, the switch 120 can include a proximity sensor 126 configured to detect when the movable surface 102 is within a predefined distance of the float 104 (e.g., a predefined proximity of the surface 124 of the float 104). Examples of the proximity sensor 126 can include an inductive proximity sensor, a capacitive proximity sensor, or an acoustic proximity sensor. In response to detecting that the movable surface 102 is within a predefined proximity (e.g., a threshold distance) of the float 104, the proximity sensor 126 can output a corresponding signal. Based on this signal, the overflow sensor 100 can transmit the notification 128 to the user.

In some examples, the overflow sensor 100 can use the proximity sensor 126 to detect when the movable surface 102 is multiple predefined distances from the float 104. In response to detecting that the movable surface 102 is at each of the predefined distances from the float 104, the overflow sensor 100 can output a corresponding notification 128. This can provide for a finer degree of granularity in the notification process. For example, multiple notifications of increasing priority or importance can be output to the user as the fluid level increases over time.

To provide the notifications 128 to the user, the overflow sensor 100 can include various electronic components. For example, the overflow sensor 100 can include a processor 110 communicatively coupled to a memory 112 and a wireless interface 116. These electronic components may be disposed in the float 104 (which can serve as a body of the overflow sensor 100), the movable surface 102, or any combination thereof. If the processor 110 detects that the switch 120 is closed, for example based on a signal from a contact sensor of the switch 120, the processor 110 can transmit one or more notifications 128 via the wireless interface 116 to one or more user devices of one or more users. Additionally or alternatively, if the processor 110 detects that the movable surface 102 is less than a threshold distance from the float 104, for example based on a signal from a proximity sensor 126, the processor 110 can transmit one or more notifications 128 via the wireless interface 116 to the one or more user devices. Some or all of the electronic components can be powered by a battery 118, such as a lithium ion battery. The battery 118 and the other electronic components can be enclosed in one or more waterproof compartments of the overflow sensor 100 for protection.

The processor 110 can include one processor or multiple processors. Examples of the processor 110 can include a Field-Programmable Gate Array (FPGA), an application-specific integrated circuit (ASIC), or a microprocessor. The processor 110 can execute instructions 114 stored in the memory 112 to perform operations, such as any of the operations described herein. The instructions 114 may include processor-specific instructions generated by a compiler or an interpreter from code written in any suitable computer-programming language, such as C, C++, C#, Java, or Python.

The memory 112 can include one memory device or multiple memory devices. The memory 112 can be volatile or non-volatile (it can retain stored information when powered off). Examples of the memory 112 can include electrically erasable and programmable read-only memory (EEPROM), flash memory, or cache memory. At least some of the memory 112 includes a non-transitory computer-readable medium from which the processor 110 can read instructions 114. A computer-readable medium can include electronic, optical, magnetic, or other storage devices capable of providing the processor 110 with the instructions 114 or other program code. Examples of a computer-readable mediums include magnetic disks, memory chips, ROM, random-access memory (RAM), an ASIC, a configured processor, and optical storage.

The wireless interface 116 can be configured to facilitate a wireless network connection. Examples of the wireless interface 116 can include IEEE 802.11, Bluetooth, or radio interfaces for accessing cellular telephone networks (e.g., transceiver/antenna for accessing a CDMA, GSM, UMTS, or other mobile communications network).

In some examples, the overflow sensor 100 can also include other components to facilitate its operation. For example, the overflow sensor 100 can include one or more guides configured to minimize lateral movement of the movable surface 102 along the X-axis and/or to help promote its vertical movement along the Y-axis. The overflow sensor 100 may also include one or more guides extending outwardly from the float 104 in a lateral direction to help maintain the float 104 at a desired location in the receptacle, such as substantially in the center of the receptacle. This can prevent the overflow sensor 100 from floating off to one side of the receptacle during use. Additionally, the overflow sensor 100 can include a weight at the bottom (e.g., at the bottom center of the float 104) to help orient or maintain the overflow sensor 100 in an upright position during use.

Figure 2:
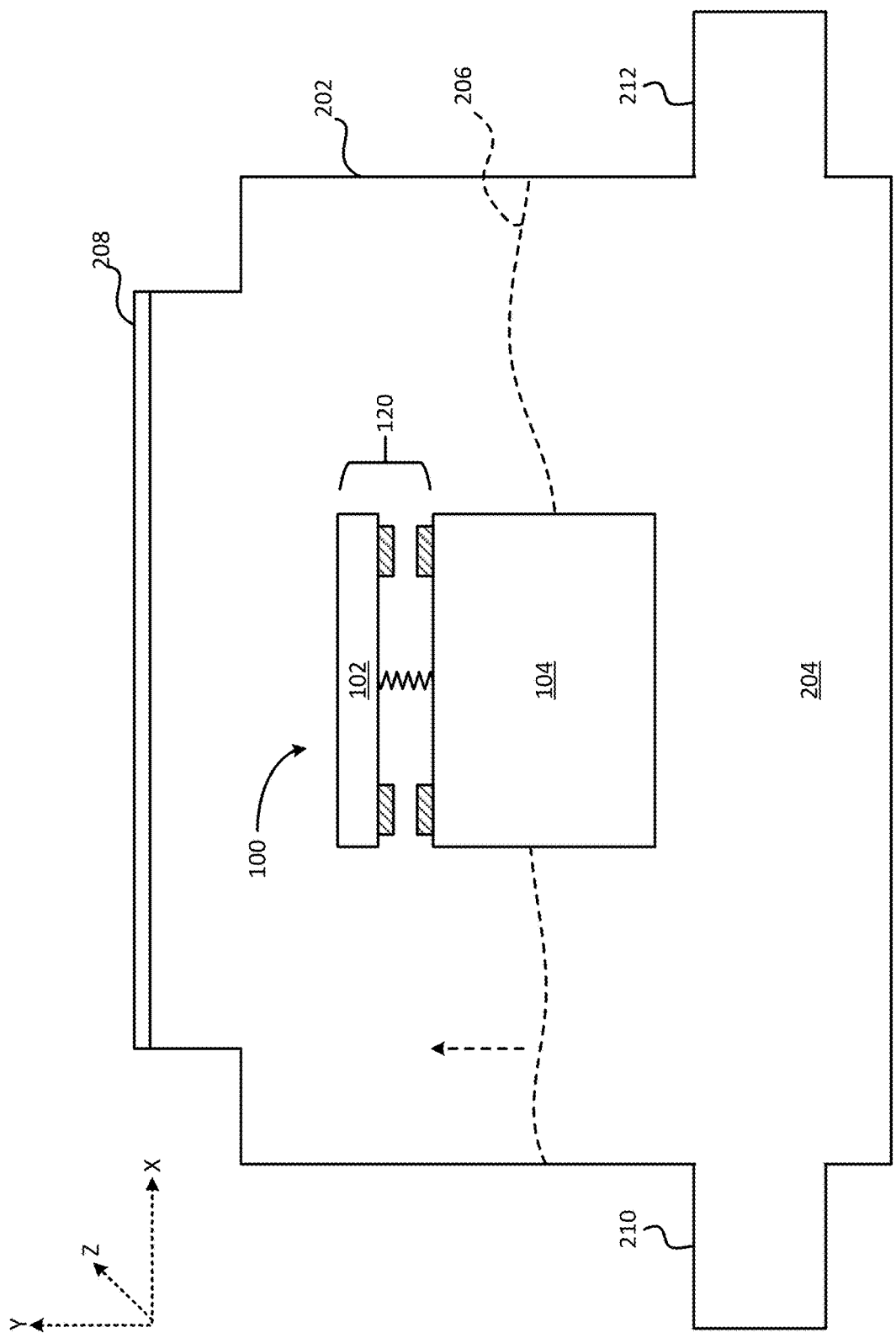
FIG. 2 shows a block diagram of an example of an overflow sensor in a grease trap according to some aspects of the present disclosure.

Turning now to FIG. 2, FIG. 2 shows a block diagram of an example of an overflow sensor 100 in a grease trap 202 according to some aspects of the present disclosure, though in other examples the overflow sensor 100 may be used with other types of receptacles and fluids. The grease trap 202 can be a receptacle through which wastewater containing fats, oil, and grease flows before entering a main drainage system, such as a sewer waste system. The grease trap 202 can be designed to intercept most fats, oils, and greases before they enter the main drainage system. The grease trap 202 can have an inlet pipe 210 and an outlet pipe 212 through which the wastewater can flow.

The overflow sensor 100 can be positioned in the grease trap 202. For example, as shown, the whole overflow sensor 100 can be disposed inside of the grease trap 202, so that there are no parts extending outside of the grease trap 202. Additionally, the whole overflow sensor 100 can float freely on the fluid 204 in the grease trap 202, because the overflow sensor 100 is not attached to any of the walls of the grease trap 202 or to any other component. For example, the overflow sensor 100 can freely move in the X-, Y-, and/or Z-directions within the grease trap 202, depending on the height and motion of the fluid 204.

Figure 3:
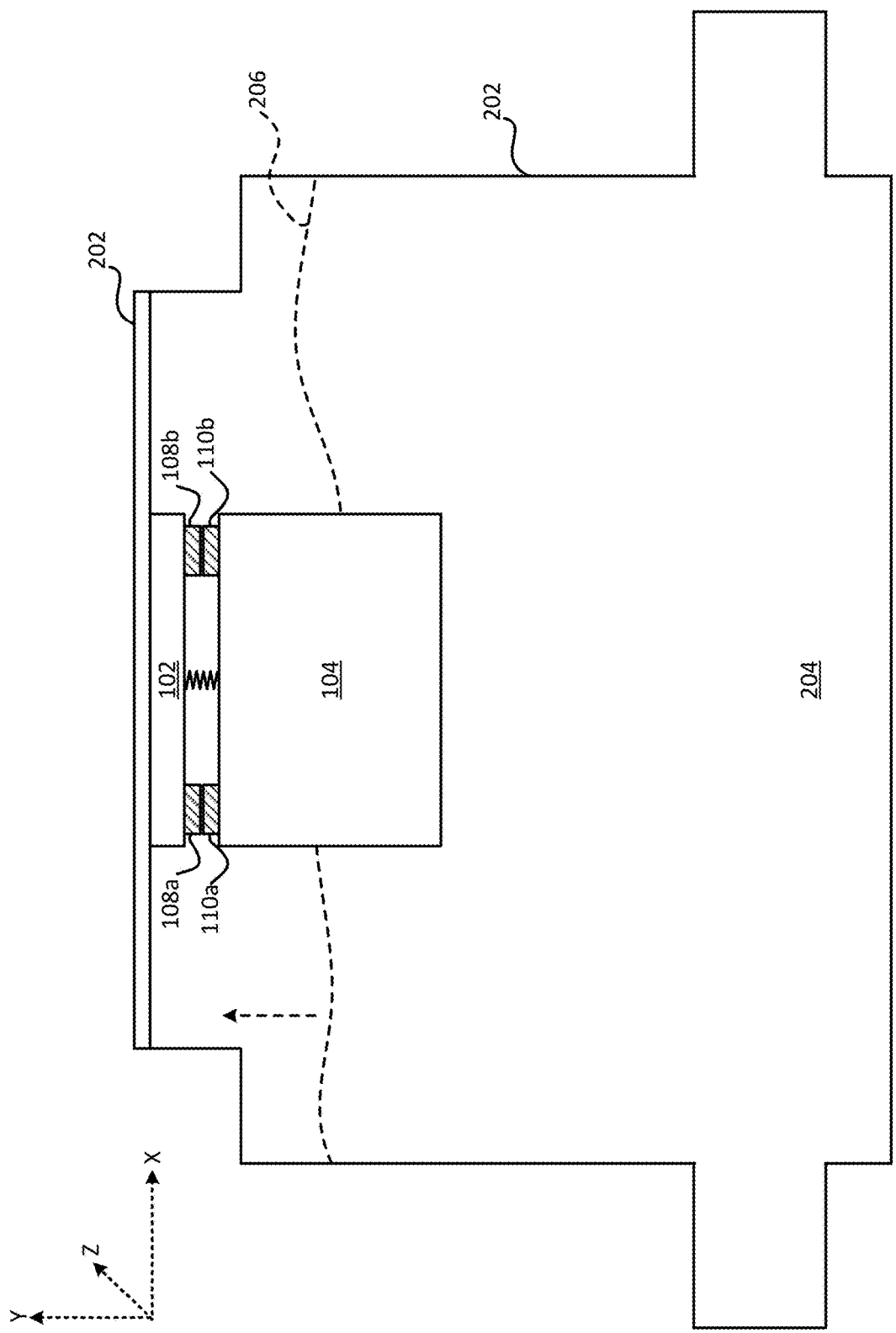
FIG. 3 shows a block diagram of the overflow sensor of FIG. 2 when the grease trap has a high fluid level according to some aspects of the present disclosure.

In the example shown in FIG. 2, the fluid 204 in the grease trap 202 is at a fluid level 206 that is sufficiently distant from an upper surface 208 (e.g., the top) of the grease trap 202 to prevent activation of the switch 120. In particular, the fluid level 206 is low enough to prevent the movable surface 102 from abutting against the upper surface 208 and compressing the resilient members. But as the amount of fluid 204 increases, the float 104 will rise with the fluid level 206. Eventually, the fluid level 206 may rise to the point where the movable surface 102 abuts against the upper surface 208 of the grease trap 202. At that point, if the fluid level 206 continues to rise, the float 104 will begin to approach the movable surface 102 and compress the resilient members. The float 104 can continue to approach the movable surface 102 until the switch 120 is activated. The switch 120 may be considered activated when it is closed, as shown in FIG. 3, or when the proximity sensor detects that the movable surface 102 is within a predefined distance of the float 104. Either way, in response to activation of the switch 120, the overflow sensor 100 can transmit a notification to warn a user that the fluid level 206 is close to overflowing.

Upon receiving the notification, the user may clean the grease trap 202. For example, the user may pump at least some of the fluid out of the grease trap 202. This may involve opening the top (e.g., upper surface 208) of the grease trap 202 to remove the excess fluid. As the fluid level 206 decreases, the height of the float 104 in the grease trap 202 may decrease correspondingly, allowing the resilient members to decompress and expand. The fluid level 206 may decrease to the point where the movable surface 102 no longer abuts against the upper surface 208 of the grease trap 202 and the switch 120 is opened. Eventually, the resilient members have fully expanded back to their default state. At this point, the overflow sensor 100 may be considered fully reset for repeat use.

Figure 4:
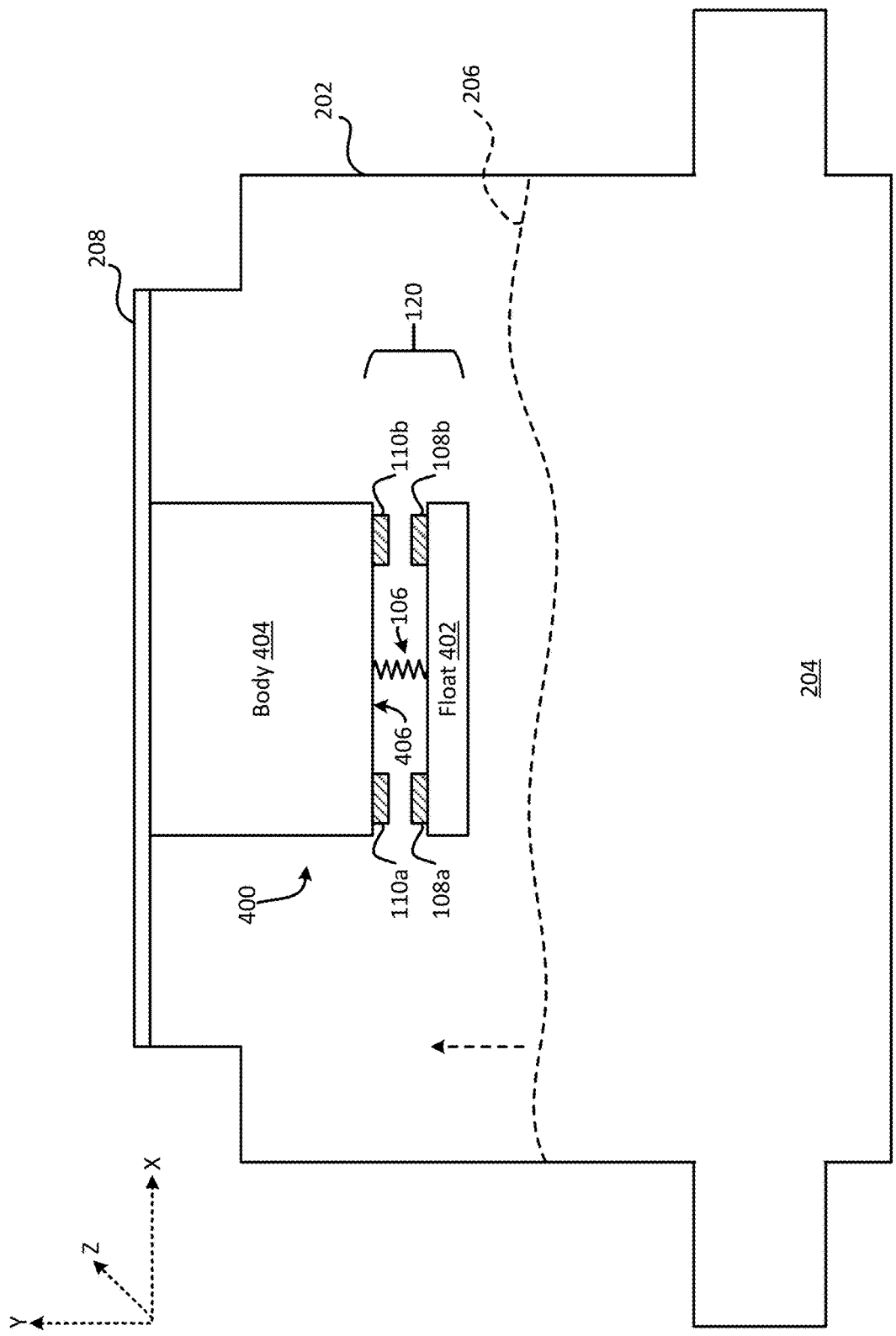
FIG. 4 shows a block diagram of an example of an overflow sensor in a grease trap according to some aspects of the present disclosure.

Turning now to FIG. 4, FIG. 4 shows a block diagram of another example of an overflow sensor 400 in a grease trap 202 according to some aspects of the present disclosure, though in other examples the overflow sensor 400 may be used with other types of receptacles and fluids. The overflow sensor 400 can include a float 402 and a body 404. The float 402 can be configured to float in a fluid 204 (e.g., water, oil, and/or grease) in the grease trap 202. For example, the float 402 can be made of plastic or rubber having a suitable density to float to the top of such a mixture. The body 404 can be affixed to an upper surface 208 of the grease trap 202, such as the underside of a top of the grease trap 202. The top may be removable to service the grease trap 202. The body 404 can be affixed to the interior of the upper surface 208 using any suitable attachment means, such as screws, bolts, nails, glue, tape, or a hook-and-loop fastener. The overflow sensor 400 can generally include similar electronic components (e.g., a processor, memory, wireless interface, and/or battery) to the overflow sensor 100 described above. Those electronic components may be disposed in the float 402, the body 404, or any combination thereof. And as shown, the entire overflow sensor 400 can be disposed inside of the grease trap 202, such that there are no parts extending outside of the grease trap 202.

Much like the overflow sensor 100 of FIG. 1, the body 404 can be coupled to the float 402 by one or more resilient members 106 to form a switch 120. The switch 120 can include a contact sensor with one or more contacts 108a-b, 110a-b, as described above. Additionally or alternatively, the switch 120 can include a proximity sensor, as described above. The resilient members 106 can be configured to normally hold the switch 120 in an open position. For example, the resilient members 106 can exert an expansion force along the vertical axis (e.g., Y-axis), which can be perpendicular to a horizontal axis (e.g., X-axis) of the float 402, to maintain the float 402 at a default distance from the body 404 during normal operating conditions.

In some examples, the overflow sensor 400 can also include other components to facilitate its operation. For example, the overflow sensor 400 can include one or more guides configured to minimize lateral movement of the float 402 along the X-axis and/or to help promote its vertical movement along the Y-axis.

Figure 5:
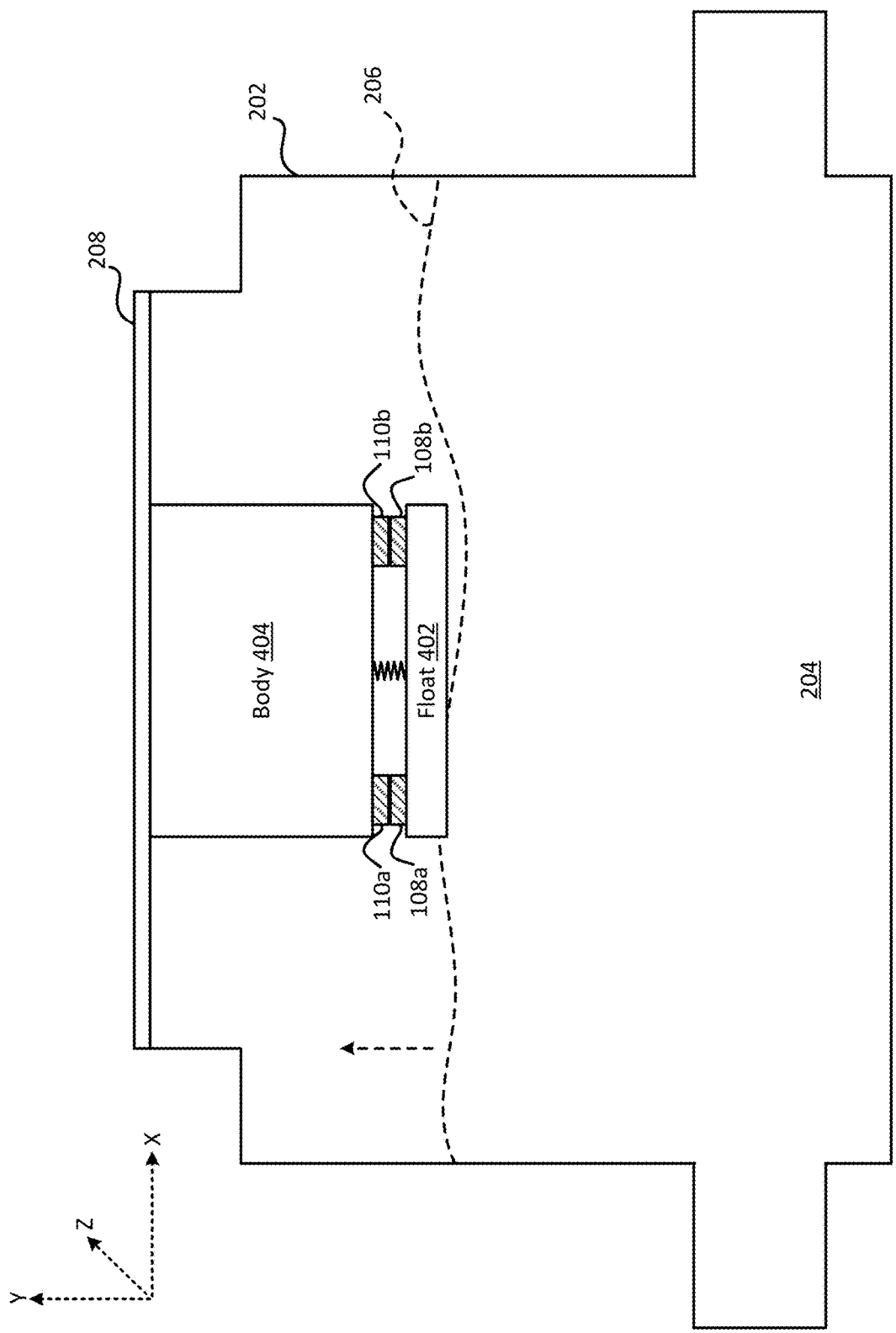
FIG. 5 shows a block diagram of the overflow sensor of FIG. 4 when the grease trap has a high fluid level according to some aspects of the present disclosure.

In the example shown in FIG. 4, the grease trap 202 has a fluid level 206 that is sufficiently distant from the upper surface 208 to activate the switch 120. In particular, the fluid level 206 is low enough to prevent the float 402 from compressing the resilient members 106 and closing the switch 120. But as the fluid level 206 increases, the fluid 204 may contact the float 402. At that point, if the fluid level 206 continues to rise, it may push the float 402 upwards towards the body 404 (e.g., the surface 406 of the body 404) until the switch 120 is activated. The switch 120 may be considered activated when it is closed, as shown in FIG. 5, or when the proximity sensor detects that the float 402 is within a predefined distance of the body 404. Either way, in response to activation of the switch 120, the overflow sensor 400 can transmit a notification to warn a user that the fluid level 206 is close to overflowing.

Upon receiving the notification, the user may clean the grease trap 202. For example, the user may pump at least some of the fluid out of the grease trap 202. This may involve opening the top (e.g., upper surface 208) of the grease trap 202 to remove the excess fluid. As the fluid level 206 decreases, the height of the float 402 in the grease trap 202 may decrease correspondingly, allowing the resilient members to decompress and expand. The fluid level 206 may decrease to the point where the float 402 no longer abuts against the body 404 of the grease trap 202 and the switch 120 is opened. Eventually, the fluid level 206 may decrease to the point where the resilient members have fully expanded back to their default state. At this point, the overflow sensor 400 may be considered fully reset for repeat use.

Figure 6:
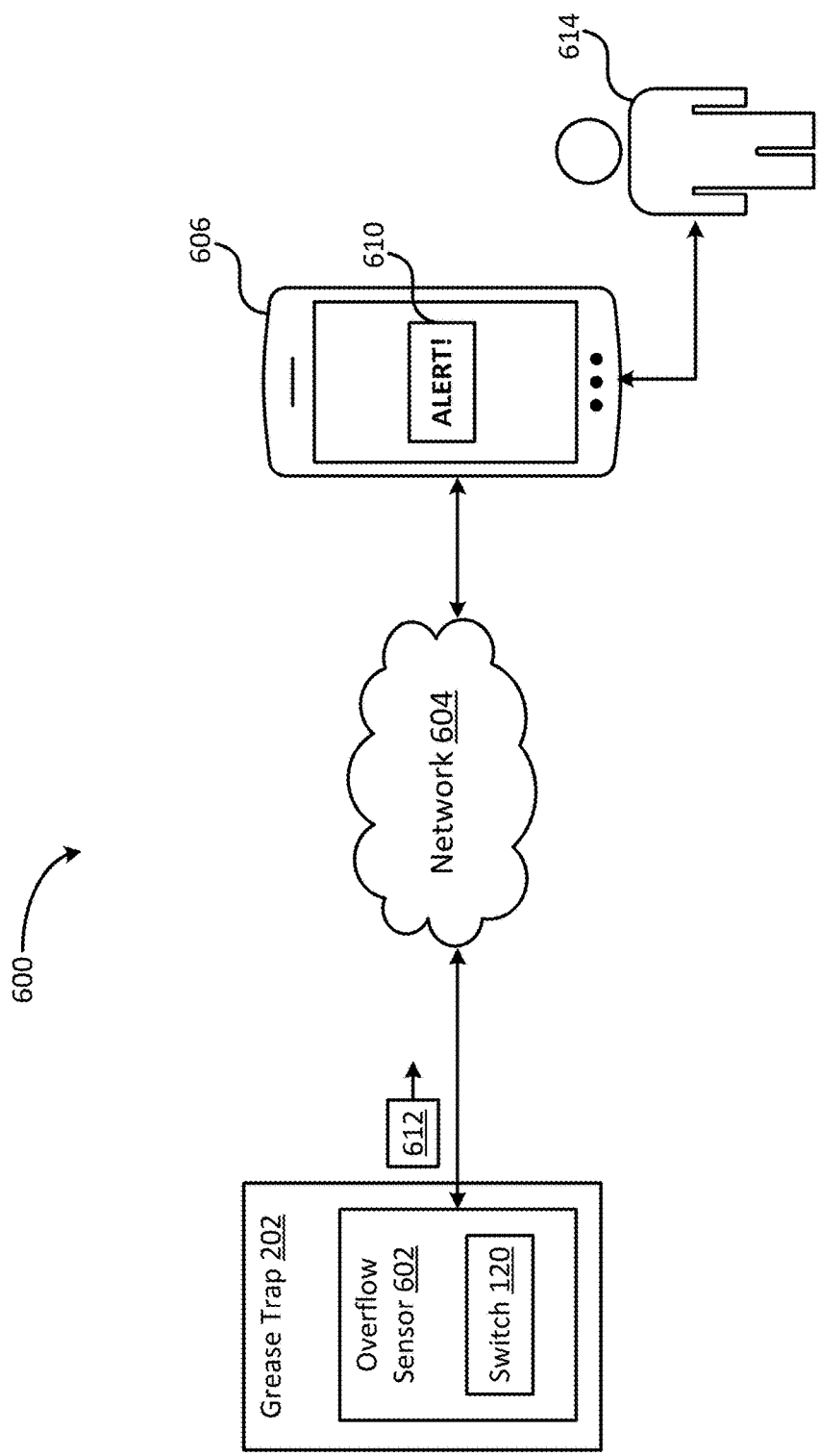
FIG. 6 shows a block diagram of an example of an overflow detection system according to some aspects of the present disclosure.

Turning now to FIG. 6, FIG. 6 shows a block diagram of an example of an overflow detection system 600 according to some aspects of the present disclosure. The overflow detection system 600 can include an overflow sensor 602 (e.g., overflow sensor 100 or overflow sensor 400) in communication with a user device 606 via one or more networks 604, such as a local area network or the Internet. Examples of the user device 606 can include a laptop computer, a desktop computer, a mobile phone such as a smartphone, a tablet, a wearable device such as a smart watch, or an e-reader. The overflow sensor 602 can detect a high fluid level in a grease trap 202 or other receptacle. The overflow sensor 602 may detect the high fluid level based on a signal from a switch 120 or based on a signal from a proximity sensor, as discussed above. In response to detecting the high fluid level, the overflow sensor 602 can transmit a notification 612 to the user device 606. The notification 612 can be wirelessly transmitted to the user device 606 via the one or more networks 604. The user device 606 can receive the notification 612 and responsively output an audio, visual, haptic, and/or other alert 610 to a user 614. This can notify the user 614 of the high fluid level, for example so that the user 614 can perform a corrective action like cleaning out the receptacle.

Figure 7:
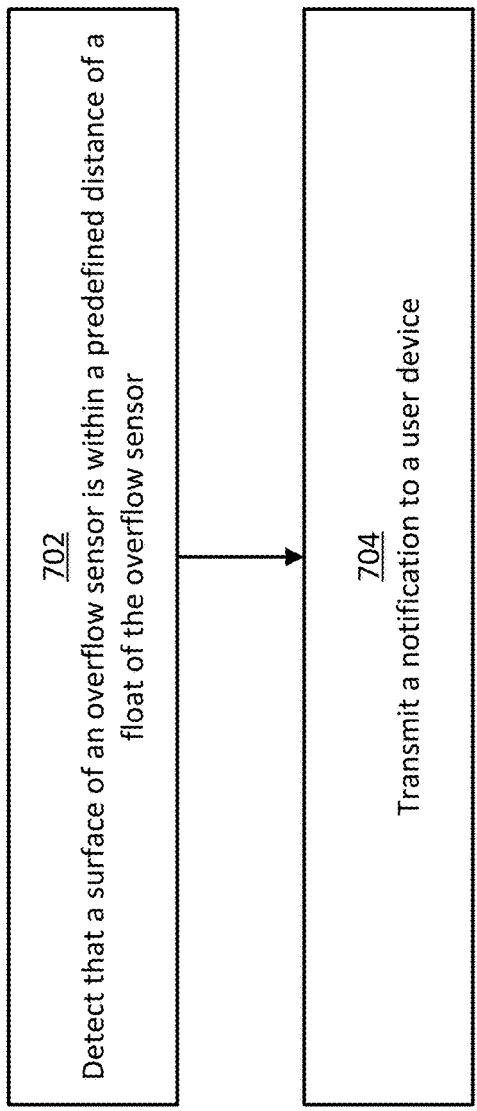
FIG. 7 shows a flowchart of an example of a process implemented by an overflow detection system according to some aspects of the present disclosure.

Turning now to FIG. 7, FIG. 7 shows a flowchart of an example of a process implemented by an overflow detection system according to some aspects of the present disclosure. The operations of FIG. 7 are described below with reference to the components of FIGS. 1-6 above.

In block 702, an overflow sensor 602 in a receptacle such as a grease trap 202 detects that a surface of the overflow sensor 602 is within a predefined distance of (e.g., contacting) a float of the overflow sensor 602. A resilient member 106 can be disposed between the surface and the float (e.g., the resilient member 106 can couple the surface to the float). For instance, in the example shown in FIGS. 1-3, the overflow sensor 602 can detect that the movable surface 102 is within a predefined distance of the float 104. In the example shown in FIGS. 4-5, the overflow sensor 602 can detect that the surface 406 (of the body 404 of the overflow sensor 602) is within a predefined distance of the float 402.

In block 704, based on detecting that the surface of the overflow sensor 602 is within the predefined distance of the float, the overflow sensor 602 transmits a notification 612 to a user device 606 that is remote from the receptacle, the notification 612 being configured to indicate a high fluid level in the receptacle.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. An overflow sensor comprising:
   a switch including:
      a float configured to float in a fluid in a receptacle, wherein the float has a first contact;
      a surface that is separate from the float, wherein the surface has a second contact;
      a resilient member coupled between the float and the surface, wherein a first portion of the resilient member is affixed to the float and a second portion of the resilient member is affixed to the surface, the resilient member being configured to normally hold the switch in an open position by spacing the float at a first distance from the surface, the switch being configured to generate a signal in response to the float being within a second distance of the surface that is closer than the first distance, wherein the resilient member is configured to allow the float to come within the second distance of the surface when the fluid in the receptacle exceeds a predefined fluid level, and wherein the resilient member is configured to prevent the float from coming within the second distance of the surface when the fluid in the receptacle does not exceed the predefined fluid level; and
a contact sensor configured to detect when the first contact of the float physically contacts the second contact of the surface and responsively generate the signal;
a processor coupled to the switch; and
a memory including instructions that are executable by the processor for causing the processor to:
receive the signal from the switch; and
in response to receiving the signal, transmit a notification to a user device that is remote from the overflow sensor;
wherein the overflow sensor is configured to generate the signal only when the first contact contacts the second contact.

2. The overflow sensor of claim 1, further comprising a wireless interface for transmitting the notification, wherein the entire overflow sensor including the wireless interface is configured to be positioned inside the receptacle.

3. The overflow sensor of claim 1, wherein the surface is movable toward or away from the float depending on a fluid level of the fluid in the receptacle, wherein the float includes the processor and the memory, and wherein the float is configured to float freely in the fluid in at least two degrees of freedom.

4. The overflow sensor of claim 1, wherein the surface is part of a body that includes the processor and the memory, the body being configured to be attached to an interior surface of the receptacle.

5. The overflow sensor of claim 4, wherein the float is movable toward or away from the body depending on a fluid level of the fluid in the receptacle.

6. The overflow sensor of claim 1, wherein the switch includes a proximity sensor, the proximity sensor comprising an inductive proximity sensor, a capacitive proximity sensor, or an acoustic proximity sensor; and
wherein the proximity sensor is configured to:
detect that the float is within the second distance of the surface; and
in response to detecting that the float is within the second distance of the surface, generate the signal.

7. A receptacle comprising:
a fluid; and
an overflow sensor that includes:
a switch comprising:
a float configured to float in the fluid in the receptacle, wherein the float has a first contact;
a surface that is separate from the float, wherein the surface has a second contact;
a resilient member coupled between the float and the surfacer, wherein a first portion of the resilient member is affixed to the float and a second portion of the resilient member is affixed to the surface; and
a contact sensor configured to detect a contact between the first contact of the float and the second contact of the surface and responsively generate a signal;
a processor coupled to the switch; and
a memory including instructions that are executable by the processor for causing the processor to:
receive the signal from the switch; and
in response to receiving the signal, transmit a notification to a user device that is remote from the receptacle;
wherein the overflow sensor is configured to generate the signal only when the first contact contacts the second contact.

8. The receptacle of claim 7, wherein the resilient member is configured to expand in length and thereby space the surface apart from the float at a default distance absent a force on the float from the fluid, the default distance being greater than a predefined distance for triggering the notification.

9. The receptacle of claim 7, wherein the resilient member is a spring that is configured to compress in response to a force applied to the float by the fluid.

10. The receptacle of claim 7, wherein the entire overflow sensor is configured to be positioned inside the receptacle.

11. The receptacle of claim 7, wherein the float includes the processor and the memory.

12. The receptacle of claim 7, wherein the surface is part of a body that includes the processor and the memory, the body being configured to be attached to an interior top surface of the receptacle.

13. A method comprising:
detecting, by a contact sensor of an overflow sensor positioned in a fluid in a receptacle, that a first contact of a surface of the overflow sensor has contacted a second contact of a float of the overflow sensor, wherein a resilient member is coupled between the float and the surface of the overflow sensor, and wherein a first portion of the resilient member is affixed to the float and a second portion of the resilient member is affixed to the surface;
generating, by the contact sensor, a signal in response to detecting that the first contact of the surface has contacted the second contact of the float, wherein the overflow sensor is configured to generate the signal only when the first contact contacts the second contact;
receiving, by a processor of the overflow sensor, the signal from the contact sensor; and
based on receiving the signal, transmitting, by the processor of the overflow sensor, a notification to a user device that is remote from the receptacle.

14. The method of claim 13, wherein the resilient member expands and contracts in length during operation of the overflow sensor, and wherein the resilient member maintains the float at a default distance from the surface absent a force on the float from the fluid, the default distance being greater than a predefined distance for triggering the notification.

15. The method of claim 13, wherein the resilient member compresses to allow the float to come within a predefined distance of the surface when the fluid exceeds a predefined fluid level, and wherein the resilient member expands to prevent the float from coming within the predefined distance of the surface when the fluid does not exceed the predefined fluid level.

16. The method of claim 13, wherein the entire overflow sensor is positioned inside the receptacle.

17. The method of claim 13, wherein the float includes the processor, and wherein the overflow sensor is configured to float freely in the fluid in three degrees of freedom.

18. The method of claim 13, wherein the surface is part of a body that includes the processor, the body being configured to be attached to an interior surface of the receptacle.

* * * * *

UNITED STATES PATENT AND TRADEMARK OFFICE
CERTIFICATE OF CORRECTION

Page 1 of 1

PATENT NO. : 12,287,232 B2
APPLICATION NO. : 18/661798
DATED : April 29, 2025
INVENTOR(S) : Natarajan Venkatakrishnan, Ryan T. Bell and Lucas S. Abrahamsen It is certified that error appears in the above-identified patent and that said Letters Patent is hereby corrected as shown below:

In the Claims

In Column 9, Line 54, Claim 7: please delete "surfacer" and insert --surface--

Signed and Sealed this
Seventeenth Day of June, 2025

Coke Morgan Stewart
*Acting Director of the United States Patent and Trademark Office*